US010587411B2

United States Patent
Kraemer et al.

(10) Patent No.: US 10,587,411 B2
(45) Date of Patent: Mar. 10, 2020

(54) ZERO-KNOWLEDGE VERIFIABLY ATTESTABLE TRANSACTION CONTAINERS USING SECURE PROCESSORS

(71) Applicant: International Business Machines Corporation, Armonk, NY (US)

(72) Inventors: James R. Kraemer, Santa Fe, NM (US); Jeb R. Linton, Herndon, VA (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 15/484,298

(22) Filed: Apr. 11, 2017

(65) Prior Publication Data

US 2018/0294962 A1    Oct. 11, 2018

(51) Int. Cl.
```
G06F 15/177    (2006.01)
H04L 9/32      (2006.01)
G06F 9/4401    (2018.01)
G06F 21/57     (2013.01)
G09C 1/00      (2006.01)
```
(52) U.S. Cl.
CPC .......... *H04L 9/3221* (2013.01); *G06F 9/4401* (2013.01); *G06F 21/575* (2013.01); *G09C 1/00* (2013.01); *H04L 9/3234* (2013.01); *G06F 9/4406* (2013.01)

(58) Field of Classification Search
CPC ..... H04L 9/3221; G06F 9/4401; G06F 21/575
USPC .......................................................... 713/2
See application file for complete search history.

(56) References Cited

U.S. PATENT DOCUMENTS

| | | | |
|---|---|---|---|
| 8,843,997 B1* | 9/2014 | Hare | H04L 63/0281 709/200 |
| 9,578,017 B2 | 2/2017 | Ferguson et al. | |
| 9,769,131 B1* | 9/2017 | Hartley | H04L 63/0428 |
| 2004/0123156 A1* | 6/2004 | Hammond, II | H04L 9/0891 726/4 |

(Continued)

OTHER PUBLICATIONS

U.S. Appl. No. 14/752,230, filed Jun. 26, 2015.

(Continued)

*Primary Examiner* — Volvick Derose
(74) *Attorney, Agent, or Firm* — Fleit Intellectual Property Law; Jon Gibbons

(57) ABSTRACT

A method, system and computer program product for providing an attestation of an operating environment. The method begins with booting, with a secure boot process with attestation, at least one processor with secure processor technology that allows user-level code to allocate private regions of memory which are protected from processes running at higher privilege levels. Next, one or more operating system containers are loaded in a server or a virtual machine. Each of the one or more operating system containers use each of their own process space and network space in order to operate on a single operating system kernel without creating separate virtual machines. If a set of one or more conditions of booting and loading has been satisfied using zero-knowledge verifiable computing then an attestation is sent calculated using a zero-knowledge verifiable computing technique to a second processor-based device.

15 Claims, 5 Drawing Sheets

(56) References Cited

U.S. PATENT DOCUMENTS

| | | | |
|---|---|---|---|
| 2007/0106892 A1* | 5/2007 | Engberg | G06Q 20/02 713/168 |
| 2007/0256125 A1* | 11/2007 | Chen | G06F 21/33 726/18 |
| 2008/0229097 A1* | 9/2008 | Bangerter | H04L 9/3218 713/155 |
| 2008/0250406 A1* | 10/2008 | Carpenter | G06F 9/45558 718/1 |
| 2009/0019285 A1* | 1/2009 | Chen | G06F 21/575 713/175 |
| 2009/0204964 A1 | 8/2009 | Foley et al. | |
| 2011/0145589 A1* | 6/2011 | Camenisch | G06F 21/6227 713/185 |
| 2011/0320823 A1* | 12/2011 | Saroiu | G06F 21/53 713/189 |
| 2012/0265976 A1* | 10/2012 | Spiers | H04L 63/0218 713/2 |
| 2013/0125221 A1* | 5/2013 | Agrawal | H04L 9/0863 726/6 |
| 2013/0198838 A1* | 8/2013 | Schmidt | H04L 9/3234 726/22 |
| 2015/0317481 A1* | 11/2015 | Gardner | H04L 9/3278 726/2 |
| 2016/0006566 A1* | 1/2016 | Morgner | G06F 21/43 713/185 |
| 2016/0050272 A1* | 2/2016 | Raduchel | H04L 67/1095 709/204 |
| 2016/0119141 A1* | 4/2016 | Jing | G06F 21/335 713/156 |
| 2017/0177909 A1* | 6/2017 | Sarangdhar | G06F 9/4401 |
| 2017/0277909 A1* | 9/2017 | Kraemer | G06F 21/6245 |
| 2017/0279611 A1* | 9/2017 | Kraemer | H04L 9/3221 |
| 2018/0247082 A1 | 8/2018 | Durham et al. | |

OTHER PUBLICATIONS

U.S. Appl. No. 14/858,389, filed Sep. 18, 2015.
U.S. Appl. No. 15/079,203, filed Mar. 24, 2016.
U.S. Appl. No. 14/970,966, filed Dec. 16, 2015.
U.S. Appl. No. 15/082,509, filed Mar. 28, 2016.

* cited by examiner

ZERO-KNOWLEDGE VERIFIABLY ATTESTABLE TRANSACTION CONTAINERS USING SECURE PROCESSORS

BACKGROUND

The present invention generally relates to anonymous cryptographic computing, and more particularly for maintaining security of computer systems and services while maintaining privacy of users.

Zero-knowledge or anonymous cryptographically verifiable computing solutions have been applied to many problems. Solutions can provide a high degree of anonymity but are vulnerable to introspection or "snooping" on the contents of memory in the physical computer system on which a service is hosted, potentially compromising user privacy through either privileged user access to the hosting node, or through physical memory bus probing.

SUMMARY

A method, system and computer program product for providing an attestation of an operating environment. The method begins with booting, with a secure boot process with attestation, at least one processor with secure processor technology that allows user-level code to allocate private regions of memory which are protected from processes running at higher privilege levels. Examples of secure processor technology include IBM Secure Blue, IBM Secure Blue++, IBM Secure Memory Facility, ARM TrustZone, and Intel Software Guard Extensions.

Next, one or more operating system containers are loaded in a server or a virtual machine. Each of the one or more operating system containers use each of their own process space and network space in order to operate on a single operating system kernel without creating separate virtual machines.

If a set of one or more conditions of booting and loading has been satisfied using zero-knowledge verifiable computing then an attestation is sent calculated using a zero-knowledge verifiable computing technique to a second processor-based device. For example, a first condition that would be calculated is a check that the secure boot had completed correctly according to register values in the Trusted Platform Module, meaning that the boot code had not been modified from its original measured, trusted state. In response to the set of one or more conditions of booting and loading has been satisfied, then sending of the attestation can be with zero knowledge protocol to maintain the privacy of a user of the processor. In one example, the set of one or more conditions are a privilege violation of one or more processes running at higher privilege levels accessing private regions of memory. In another example the set of are a physical attack of the at least one processor.

In one example a request for the attestation of the set of one or more conditions is received from another user using a zero-knowledge protocol to maintain privacy of a user of the at least one processor. In another example the attestation is automatically sent determining if a settable time period is expired and the set of one or more conditions have been satisfied.

A few examples of zero-knowledge verifiable computing include but are not limited to: a succinct computational integrity and privacy (SCIP) technique; a zero-knowledge succinct non-interactive argument of knowledge (zk-snark) technique; or a probabilistically checkable proof (PCP) technique. The proof can be whether the program is using at least one of trusted computing, secure boot attestation, verified operation of a medical application, or a combination or derivative technique thereof.

Other embodiments of the invention include a system and a computer program product.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
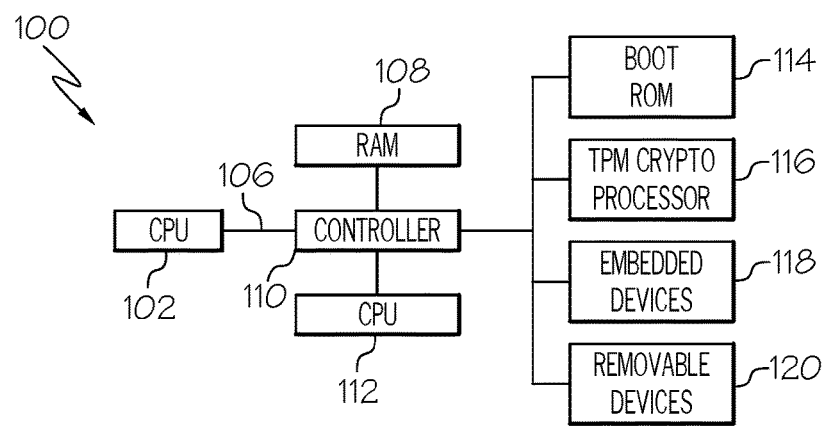
FIG. 1 are the components of a trusted platform model (TPM)

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention is presented for purposes of illustration and description, but is not intended to be exhaustive or limited to the invention in the form(s) disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

The present invention provides a decentralized, zero-knowledge, and verifiable cloud service which is protected from privileged user and process attacks, and from physical attacks. Physical attacks include memory bus probes through the use of advanced secure processor technology. The present invention overcomes the challenge of maintaining privacy and anonymity on a public cloud.

The present invention provides cloud based services using an operating system container or secure transaction container as further defined below. A secure processor technology not only encompasses those technologies which can protect processes, containers, or virtual machines from introspection by privileged users or system processes but also protects against "lab attacks" which require physical access to the processing device, such as memory bus probe attacks.

The operating system container is an embodiment of a Linux or Windows container or equivalent, on a computer system equipped to perform local or remote attestation using trusted computing. The container itself doesn't necessarily have to be attestable, though that would be a preferred embodiment. In a preferred embodiment, both the content of the operating system container and the integrity of the underlying platform is measured during the boot process and the subsequent load of the operating system container, with measurements placed securely in one or more virtual and/or physical trusted platform modules. These measurements can be locally attested using trusted computing and verified remotely using zero knowledge cryptographic verified computing techniques.

A preferred embodiment of these services as zero-knowledge verifiable attestable operating system containers using secure processors, the services would be advertised through the decentralized registry.

In other embodiments of this invention would use secure applications or secure virtual machines instead of operating system containers; these options may be preferred in some cases due to more efficient resource utilization or richer features, but would provide similarly robust protection of workload privacy and integrity.

Non-Limiting Definitions

The terms "a", "an" and "the" are intended to include the plural forms as well, unless the context clearly indicates otherwise.

The term "attestation" means to provide a response that support or that opposes the veracity of a statement.

The terms "comprises" and/or "comprising", when used in this specification, specify the presence of stated features, steps, operations, elements, and/or components, but do not preclude the presence or addition of one or more other features, integers, steps, operations, elements, components, and/or groups thereof.

The term "processor based device" means a smartphone, GPS, smart watch, fitness tracker, computer or any other device capable of providing a providing zero-knowledge verifiable computing environment.

The term "operating system container" is an operating system container using an operating-system-level virtualization method for running multiple isolated systems (containers) on a control host using a single kernel without creating separate virtual machines. Operating system containers are commonly found in Window (Windows Container) or Linux (Linux Container). Each of the operating system containers use each of their own process space and network space in order to operate on a single operating system kernel without creating separate virtual machines.

The term "secure boot process with attestation" is a boot process for a processor based device that computes a hash of the operating system boot loader and boot drivers and reports the hash value to identify tampering. One example is trusted platform module (TPM) which is an international standard for a secure processor.

The term "secure processor technology" is computer hardware that enables the execution of code in a separate protected space that cannot be accessed by other privileged processes or users. Sometimes this is embodied in the form of an encrypted working memory space (as in the case of SecureBlue++ and Intel SGX), but sometimes other mechanisms are used that don't encrypt the memory, as in IBM SMF and ARM Trustzone.

The phrase "Trusted Computer Module" or TPM is a standard for a secure cryptoprocessor, which is a dedicated microcontroller designed to secure hardware by integrating cryptographic keys into devices.

The phrase "verifiable computing" in cryptography, is a method by which one party, the prover (also referred to herein as a "user"), can prove to another party, the verifier that a program has been or is being executed correctly and without modification or tampering.

A "zero-knowledge protocol", in cryptography, is a method by which one party, the prover, (also referred to herein as a "user"), can prove to another party, the verifier (also referred to herein as a "service provider") providing a service that a given statement is true, without conveying any information apart from the fact that the statement is indeed true.

The phrase "zero-knowledge verifiable computing" is a method of verifiable computing whereby a program is specially compiled to perform a function and produce a result while simultaneously computing and providing a cryptographic proof that it executed correctly in untampered-with form. The computed proof can be probabilistically checked to verify the integrity of the computation, to varying levels of assurance depending on how many bits of the proof the checker chooses to verify. This method is known in the art as a Probabilistically Checkable Proof (PCP) and may take several forms, including interactive proof during the execution of the program and non-interactive proof at the completion of the program execution. The phrase "zero-knowledge verifiable computing" is a method of verifiable computing which can also provide the proof of integrity through a zero-knowledge protocol. This combination of Verifiable Computing with a Zero-Knowledge protocol, often also using a succinct method such as Succinct Computational Integrity and Privacy (SCIP) and zero-knowledge Succinct Non-Interactive Arguments of Knowledge (zkSNARK) techniques, combining the advantages of verifiability, succinctness, and zero-knowledge operation to maximize assurance of both integrity and privacy while minimizing computational cost.

Trusted Computer Platform

FIG. 1 are the components of an known trusted platform model (TPM) 100. There are three basic features: protection capabilities, integrity measurement, and integrity reporting.

As shown in FIG. 1, TPM 100 in computer is shown in the form of a general-purpose computing device. The components of the TPM 100 may include, but are not limited to, one or more processors (CPU) or processing units 102, a system memory 104, and a bus 106 that couples various system components including system memory 104 to processing units 102 and TPM secure crypto-processor 116.

Bus 106 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

TPM 100 typically includes a variety of computer system readable media. Such media may be any available media that is accessible by TPM 100 through embedded devices 118 or removable devices 120 or, and it includes both volatile and non-volatile media, removable and non-removable media.

System memory 108, in one embodiment, implements the functions of processor-based device 100 and the processes described with reference to FIG. 3 below. The system memory 108 can include computer readable media in the form of volatile memory, such as random access memory (RAM) 108 and/or cache memory (not shown). TPM 100 may further include other removable/non-removable, volatile/non-volatile computer system storage media. By way of example only, storage system 108 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 106 by one or more data media interfaces. As will be further depicted and described below, memory 108 may include at least one computer program product having a set (e.g., at least one) of program modules stored that are configured to carry out functions of various embodiments of the invention.

Program/utility, having a set (at least one) of program modules, may be stored in memory 108 by way of example, and not limitation, as well as an operating system, one or more application programs, other program modules, and program data. Each of the operating system, one or more application programs, other program modules, and program data or some combination thereof, may be adapted to a networking environment. In some embodiments, program modules carry out the functions and/or methodologies of various embodiments of the invention described herein.

TPM 100 may also communicate with one or more removable devices 120 and embedded devices 118 including external devices such as a keyboard, a pointing device, a display 112, etc. Such external devices include one or more devices that enable a user to interact with TPM 100; and/or any devices (e.g., network card, modem, etc.) that enable TPM 100 to communicate with one or more other computing devices. Such communication/interaction can occur via I/O interfaces. In some embodiments TPM 100 can communicate with one or more networks such as a local area network (LAN), a general wide area network (WAN), and/or a public network (e.g., the Internet) via network adapter (not shown). It should be understood that although not shown, other hardware and/or software components could be used in conjunction with TPM 100. Examples, include, but are not limited to: microcode, device drivers, redundant processing units, external disk drive arrays, RAID systems, tape drives, and data archival storage systems, etc.

Operating System Container & Run Time Container

Containers in Linux and Windows are an operating-system-level virtualization environment for running multiple isolated systems (containers) on a single control host. Containers provide operating system-level virtualization through a virtual environment that has its own process and network space, instead of creating a full-fledged virtual machine. This makes containers much more light-weight, faster and less resource consuming than Virtual Machines, which makes it perfect for some scenarios, especially development test scenarios or for worker roles.

Figure 2:
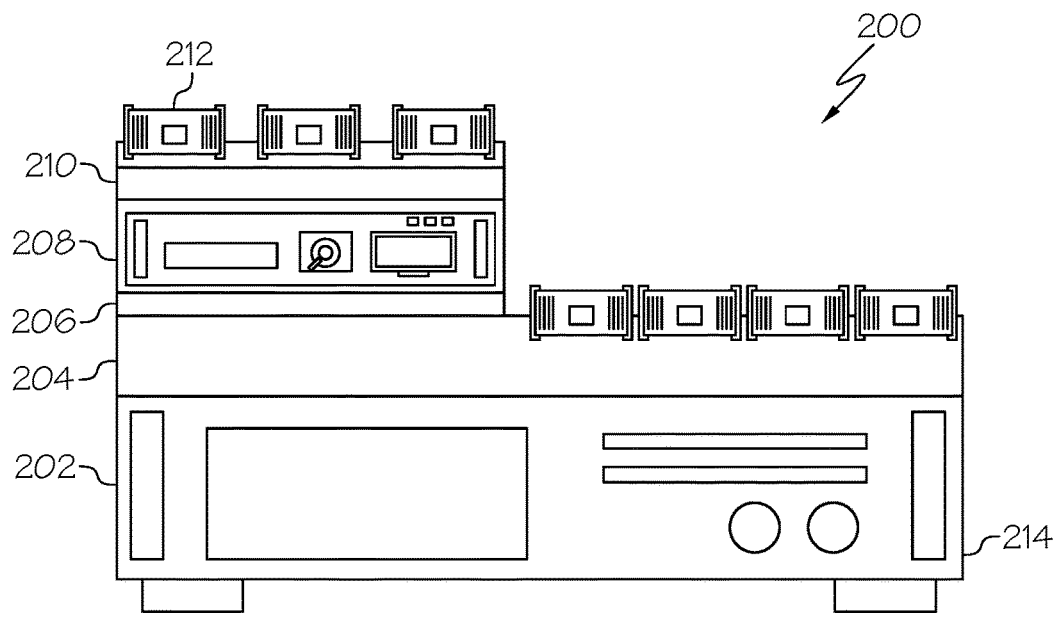
FIG. 2 is a diagram of a virtual machines on physical server platform.

FIG. 2 is a diagram 200 of virtual machines on physical server hardware platform 202 with both operating system containers 214 and application containers 212. With virtual machines created simulated some virtual hardware 206 on top of the operating system 204 of the physical server 202. The operating system 210 is installed inside the virtual machine 208 on top of the virtual hardware and installed application inside the VM 208. An operating-system-level virtualization environment is used with application containers 212 which create boundaries between different applications. This is so efficient that multiple applications can be run side by side without effecting each other. Since this is operating-system-level virtualization it is possible not only directly on the operating system 204 on the physical hardware 202, but also use operating-system-level virtualization inside a virtual machine 208.

Figure 3:
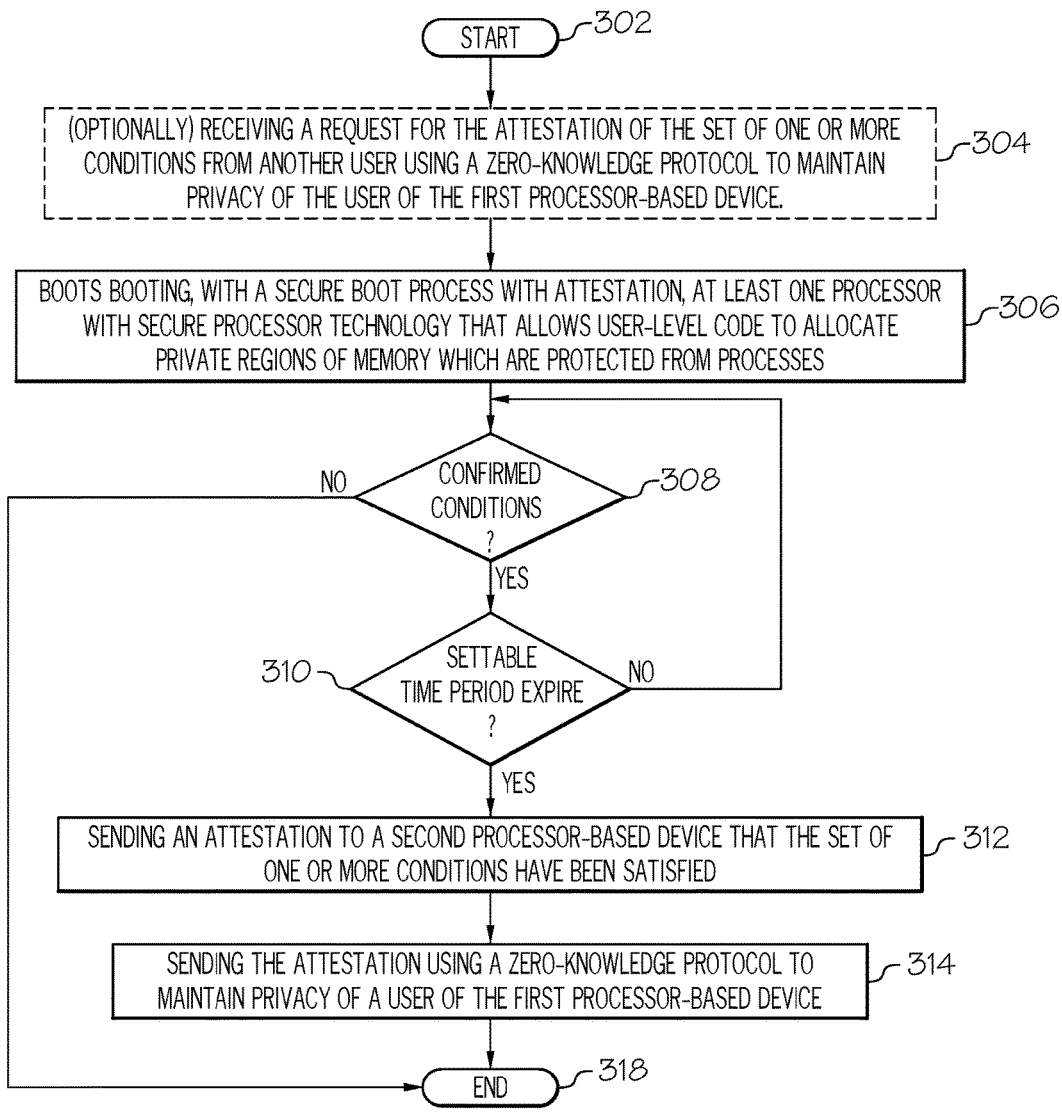
FIG. 3 is a flow diagram providing attestation of an operating system environment.

Zero-Knowledge Verifiably Attestable Transaction Containers Using Secure Processors FIG. 3 is a flow diagram providing attestation of an operating system environment. The process starts in step 302 and immediately proceeds to an optional step 304, in which a user using a second processor-based device, such as trusted platform module 100 of FIG. 1, to initiate a process, in step 302. The process immediately proceeds to step 306.

In step 306, the TPM 100 boots, with a secure boot process with attestation, at least one processor with secure processor technology that allows user-level code to allocate private regions of memory which are protected from processes running at higher privilege levels. After booting, one or more operating system containers are loaded in a server or a virtual machine. Each of the operating system containers use each of their own process space and network space in order to operate on a single operating system kernel without creating separate virtual machines.

In step 308 if a set of one or more conditions of booting has been satisfied using zero-knowledge verifiable computing then the process continues to step 310 otherwise the process ends in step 318. In one example, the testing of conditions are shown in two steps i.e. steps 308 and 310, however in other implementations these can be combined into one step.

In step 310, a settable time period may be set to determine if all the parameters have been set. If a set of one or more conditions of booting has been satisfied using zero-knowledge verifiable computing are confirmed in step 308 and 310 the process continues to step 312 or loops back to wait until a period of time has elapsed before continuing to step 312.

In step 312 an attestation is sent from the TPM 100 to the second processor-based device (shown in FIGS. 4, 418, 416, 420, and 422), using a zero-knowledge protocol to maintain privacy of the user of the trusted computing platform 100. The process then proceeds to step 318 to end.

Generalized Computing Environment

Figure 4:
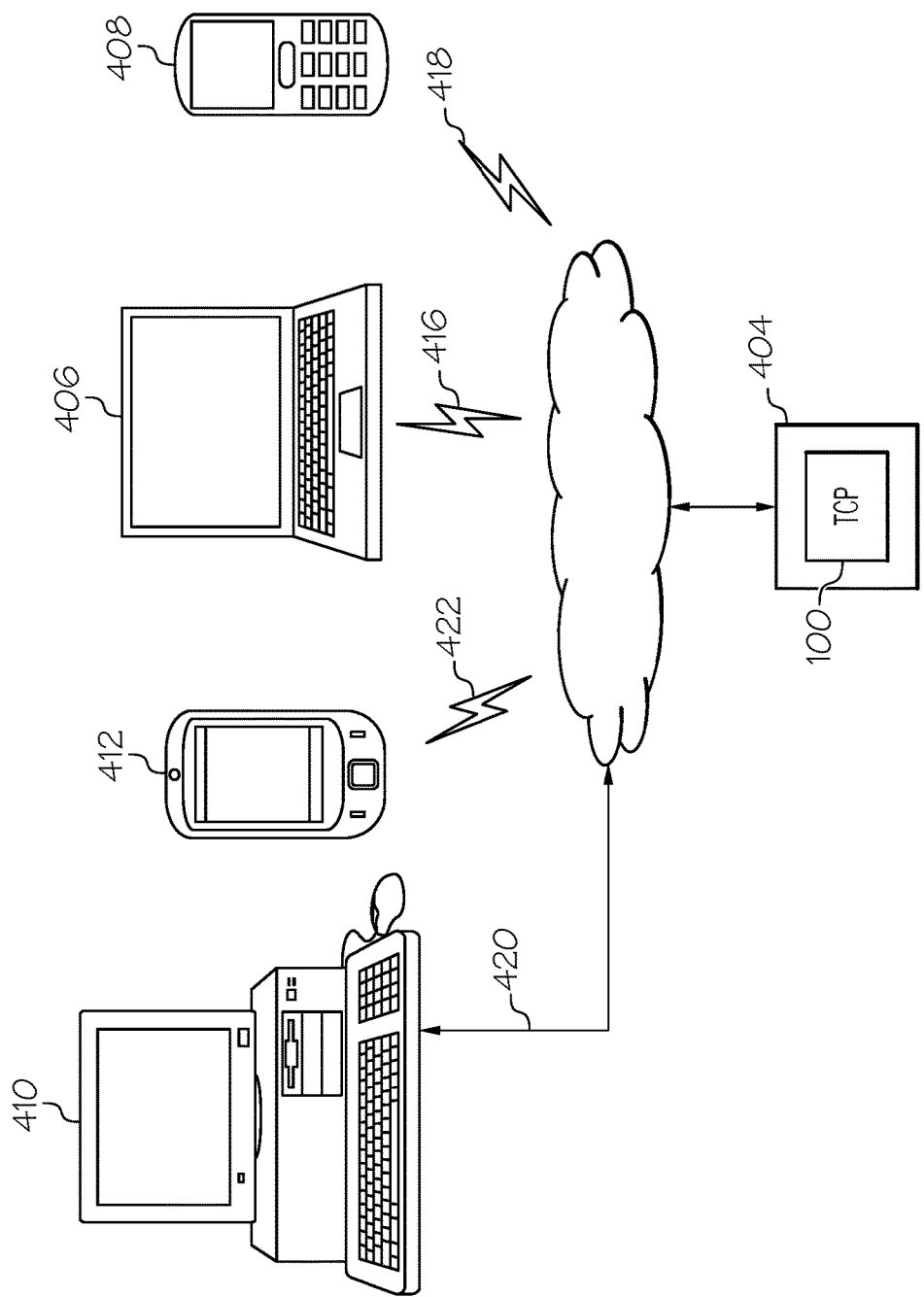
FIG. 4 illustrates a computing node with TPM.

FIG. 4 illustrates a trusted computing platform node useful in implementing the present invention. Referring to FIG. 4 shown is a client-server architecture with clients 406, 408, 410, 412 and at least one server 404.

The exemplary server 404 includes the trusted computer platform (TPM) 100 of FIG. 1.

The system of FIG. 4 includes several exemplary clients 406, 408, 410, 412. A client is a computer or a process or thread running on a computer that requests resources or services from another computer. Clients of FIG. 4 include: a personal computer 410 coupled to the network 402 through a wireline connection 420, a personal digital assistant (PDA) 412 coupled to the network 402 through a wireless connection 422, a laptop computer 406 coupled to the network 402 through a wireless connection 416, and a mobile telephone 408 which is coupled to the network 402 through a wireless connection 418.

The system of FIG. 4 includes a data communications network 402 which provides for data communications among clients 406, 408, 410, 412, and web server 404. A network is a group of computers coupled for data communications according to data communications protocols through other computers typically referred to as routers, bridges, or switches. (The routers, bridges, and switches are not shown on FIG. 4.

The system of FIG. 4 includes server 404. A server is a computer or a process or thread running on a computer that receives, processes, and responds to requests for resources or services from another computer. A web server is a server that carries out data communication according to a hyperlinking protocol. A common example of a hyperlinking protocol is the HyperText Transfer Protocol, the foundation of the World Wide Web. The term 'web server' is used in this specification more broadly, however, to refer to any server that support any hyperlinking protocol, including, for example, the Wireless Access Protocol (WAP), the Handheld Device Transport Protocol (HDTP), and others as will occur to those of skill in the art. The web server 404 provides static web pages in responses to clients as well as dynamic web pages in such formats as Java Server Pages (JSP), PHP Hypertext Processor (PHP) pages, Microsoft's Active Server Pages (ASP), and Common Gateway Interface (CGI) scripts, and others as will occur to those of skill in the art.

Cloud Computing Environment

Figure 5:
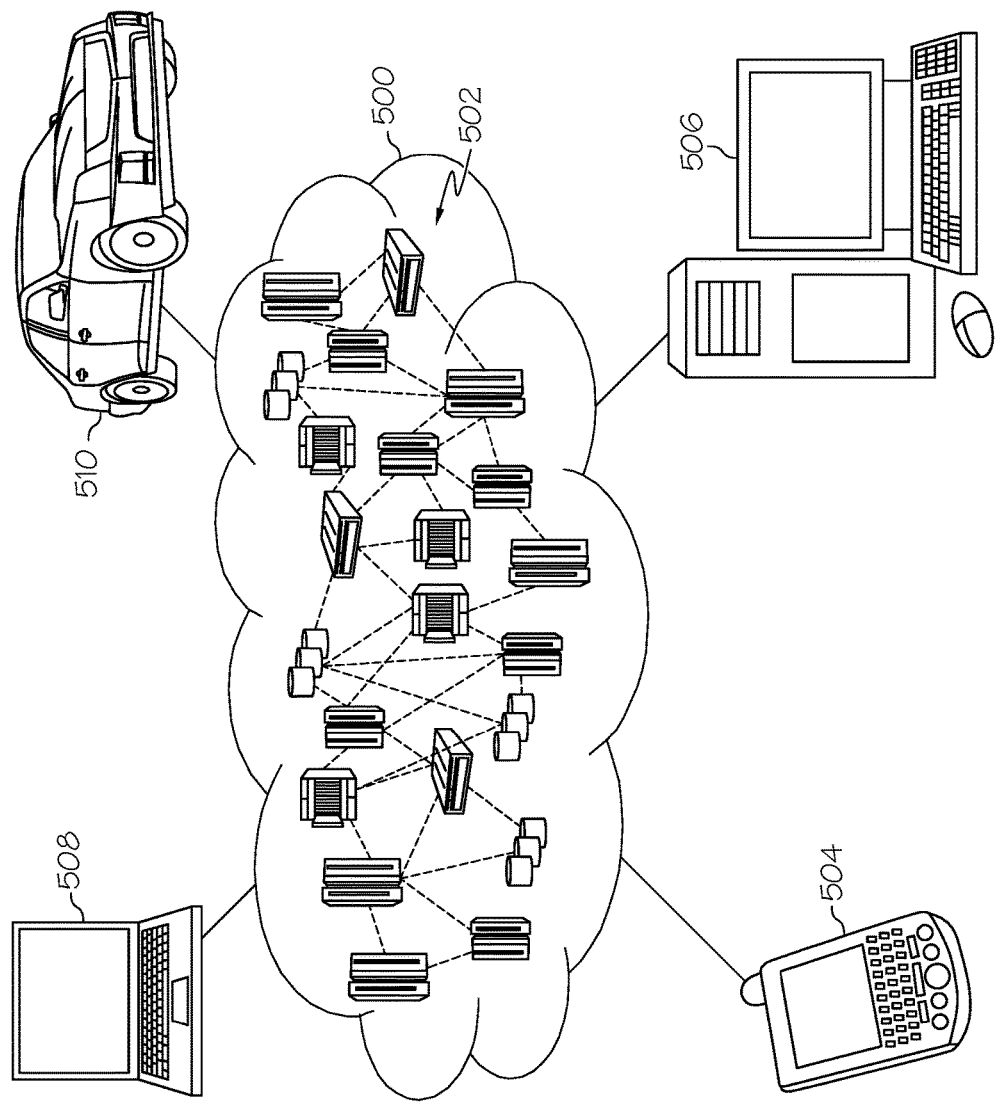
FIG. 5 illustrates one example of a cloud computing environment.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504, desktop computer 506, laptop computer 508, and/or automobile computer system 510 may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504, 506, 508, 510 shown in FIG. 5 are intended to be illustrative only and that computing nodes 502 and cloud computing environment 500 can communicate with any type of computerized device over any type of network and/or network addressable connection (e.g., using a web browser).

Figure 6:
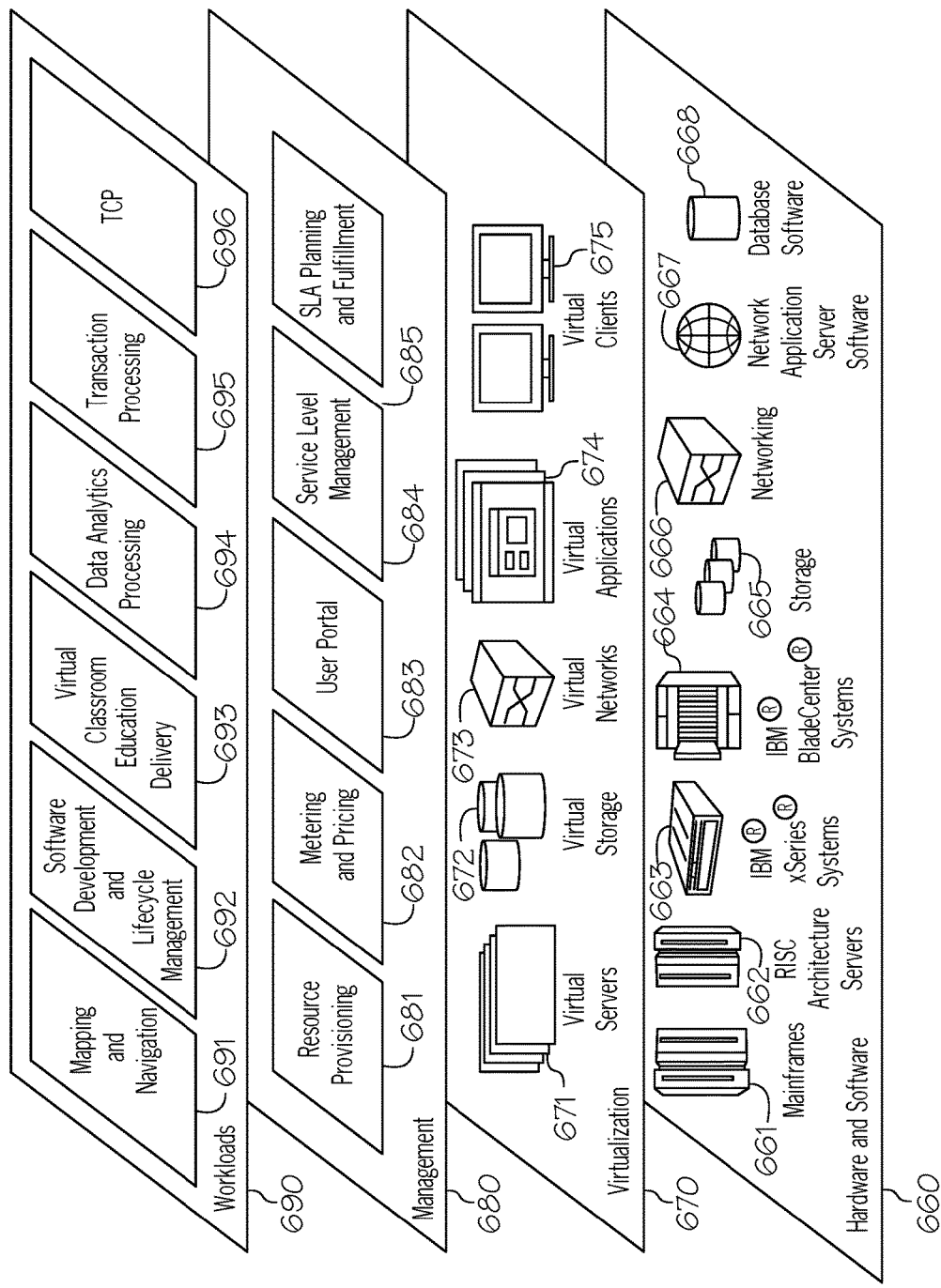
FIG. 6 illustrate abstraction model layers of FIG. 5.

Referring now to FIG. 6, an exemplary set of functional abstraction layers provided by cloud computing environment 500 is shown. It is understood in that the components, layers, and functions shown in FIG. 6 are illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and a service for providing an attestation of an operating system environment 696 in accordance with embodiment of the present invention.

Computer Program Product Support

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Non-Limiting Examples

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for providing attestation of an operating system environment, the method comprising:
  receiving a request for a attestation of a set of one or more conditions from another user using a zero-knowledge protocol to maintain privacy of a user of at least one processor;
  booting, with a secure boot process with attestation, the at least one processor with secure processor technology that allows user-level code to allocate private regions of memory which are protected from processes running at higher privilege levels;
  loading one or more zero-knowledge verifiable attestable operating system containers in a server or a virtual machine, with a secure process with attestation placed in at least one trusted platform module, where each of the one or more operating system containers use each of their own process space and network space in order to operate on a single operating system kernel without creating separate virtual machines;
  determining if the set of one or more conditions of booting and loading has been satisfied using zero-knowledge verifiable computing; and
  in response to the set of one or more conditions having been satisfied, maintaining the privacy of the user of the at least one processor by sending an attestation calculated using a zero-knowledge protocol to a second processor-based device that the set of one or more conditions have been satisfied.

2. The method of claim 1, further comprising:
determining if a settable time period is expired; and
in response to the settable time period is expired along with the set of one or more conditions having been satisfied, sending an attestation that the set of one or more conditions have been satisfied using a zero-knowledge protocol to maintain privacy of the user.

3. The method of claim 1, wherein the secure processor technology is one of IBM Secure Blue, IBM Secure Blue++, IBM Secure Memory Facility, ARM TrustZone, and Intel Software Guard Extensions.

4. The method of claim 1, wherein the set of one or more conditions are a privilege violation of one or more processes running at higher privilege levels accessing private regions of memory.

5. The method of claim 1, wherein the set of one or more conditions are a physical attack of the at least one processor.

6. The method of claim 1, wherein the zero-knowledge verifiable computing is one of
succinct computational integrity and privacy (SCIP) technique;
succinct non-interactive argument of knowledge (zk-snark) technique; and
probabilistically checkable proof (PCP) technique.

7. The method of claim 1, wherein the set of one or more conditions is a verification that the secure boot process had executed to completion without a failed integrity check.

8. A system for providing attestation of an operating system environment, the system comprising:
a memory;
a processor communicatively coupled to the memory, where the processor is configured to perform
receiving a request for a attestation of a set of one or more conditions from another user using a zero-knowledge protocol to maintain privacy of a user of at least one processor;
booting, with a secure boot process with attestation, the at least one processor with secure processor technology that allows user-level code to allocate private regions of memory which are protected from processes running at higher privilege levels;
loading one or more zero-knowledge verifiable attestable operating system containers in a server or a virtual machine, with a secure process with attestation placed in at least one trusted platform module, where each of the one or more operating system containers use each of their own process space and network space in order to operate on a single operating system kernel without creating separate virtual machines;
determining if the set of one or more conditions of booting and loading has been satisfied using zero-knowledge verifiable computing; and
in response to the set of one or more conditions having been satisfied, maintaining the privacy of the user of the at least one processor by sending an attestation calculated using a zero-knowledge protocol to a second processor-based device that the set of one or more conditions have been satisfied.

9. The system of claim 8, further comprising:
determining if a settable time period is expired; and
in response to the settable time period is expired along with the set of one or more conditions having been satisfied, sending an attestation that the set of one or more conditions have been satisfied using a zero-knowledge protocol to maintain privacy of the user.

10. The system of claim 8, wherein the secure processor technology is one of IBM Secure Blue, IBM Secure Blue++, IBM Secure Memory Facility, ARM TrustZone, and Intel Software Guard Extensions.

11. The system of claim 8, wherein the set of one or more conditions are a privilege violation of one or more processes running at higher privilege levels accessing private regions of memory.

12. The system of claim 8, wherein the set of one or more conditions are a physical attack of the at least one processor.

13. The system of claim 8, wherein the zero-knowledge verifiable computing is one
of succinct computational integrity and privacy (SCIP) technique;
succinct non-interactive argument of knowledge (zk-snark) technique; and
probabilistically checkable proof (PCP) technique.

14. The system of claim 8, wherein the set of one or more conditions is a verification that the secure boot process had executed to completion without a failed integrity check.

15. A non-transitory computer program product for providing attestation of an operating system environment comprising a computer readable storage medium having computer readable program code embodied therewith, the computer readable program code configured to perform:
receiving a request for a attestation of a set of one or more conditions from another user using a zero-knowledge protocol to maintain privacy of a user of at least one processor;
booting, with a secure boot process with attestation, the at least one processor with secure processor technology that allows user-level code to allocate private regions of memory which are protected from processes running at higher privilege levels;
loading one or more zero-knowledge verifiable attestable operating system containers in a server or a virtual machine, with a secure process with attestation placed in at least one trusted platform module, where each of the one or more operating system containers use each of their own process space and network space in order to operate on a single operating system kernel without creating separate virtual machines;
determining if the set of one or more conditions of booting and loading has been satisfied using zero-knowledge verifiable computing; and
in response to the set of one or more conditions having been satisfied, maintaining the privacy of the user of the at least one processor by sending an attestation calculated using a zero-knowledge protocol to a second processor-based device that the set of one or more conditions have been satisfied.

* * * * *